Nov. 18, 1930.    A. SMITH    1,781,961
BROOMCORN HARVESTER
Filed Dec. 13, 1926    4 Sheets-Sheet 1

Augustus Smith
INVENTOR.
by
G. J. Rollandet
Atty.

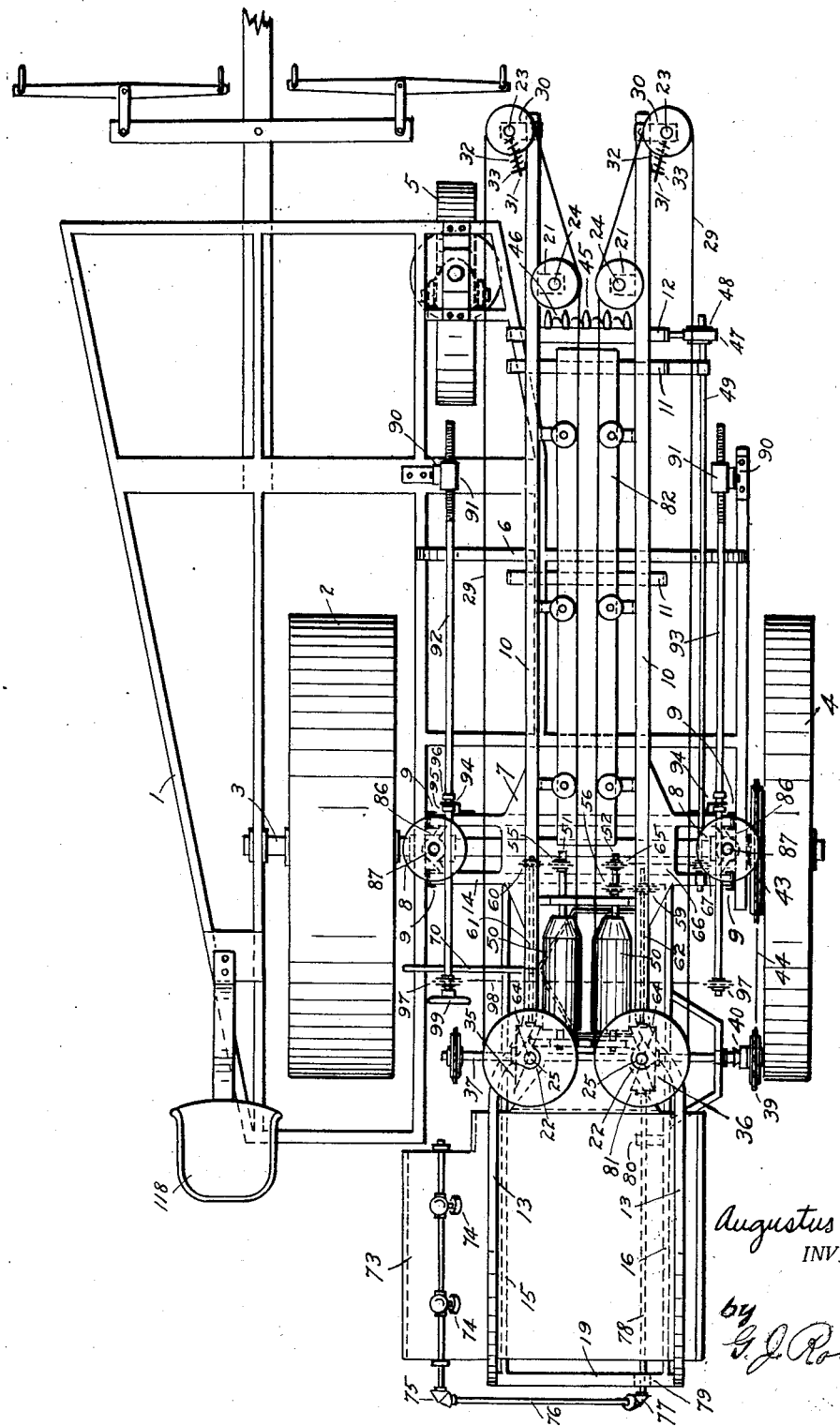

Nov. 18, 1930.  A. SMITH  1,781,961
BROOMCORN HARVESTER
Filed Dec. 13, 1926  4 Sheets-Sheet 3
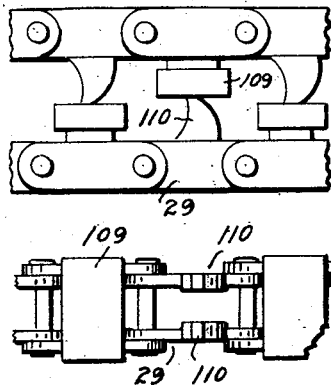
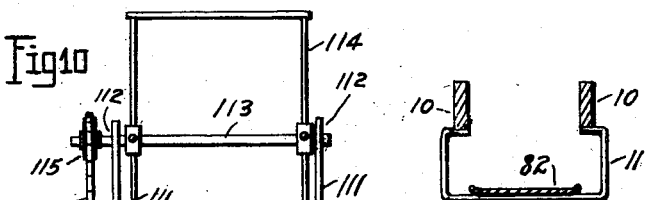
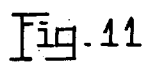
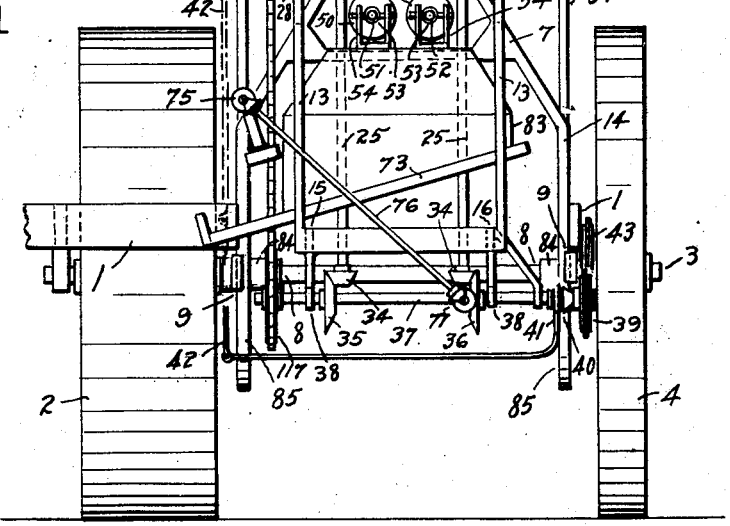
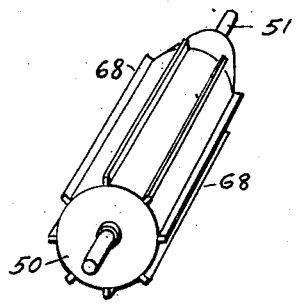
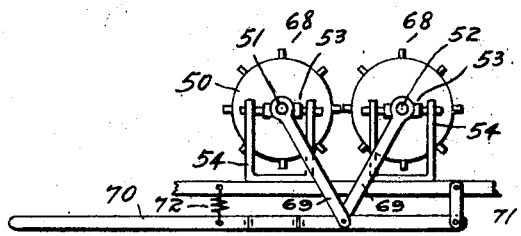
Augustus Smith
INVENTOR.
BY Nov. 18, 1930.  A. SMITH  1,781,961

BROOMCORN HARVESTER

Filed Dec. 13, 1926  4 Sheets-Sheet 4

Augustus Smith
INVENTOR.

BY
G. J. Rollandet
Atty

Patented Nov. 18, 1930

1,781,961

UNITED STATES PATENT OFFICE

AUGUSTUS SMITH, OF DENVER, COLORADO, ASSIGNOR TO CATHERINE TERESA DALY AND MARY BARBARA DALY, BOTH OF BILLINGS, MONTANA

BROOMCORN HARVESTER

Application filed December 13, 1926. Serial No. 154,621.

My invention relates to a machine for harvesting the brush head or top from broom corn stalks growing in rows in the field, and provides means for harvesting the brush head units with substantially uniform length of stem irrespective of any variation of type of plant, whether tall medium or dwarf, and irrespective of irregularities of individual plant growth along the rows.

In the ordinary method adopted in the past for gathering broom corn of the tall variety, an advance operator walking along a given row seizes the growing stalk at a point a few feet above the ground and bends the uppermost portion down to an approximately horizontal position. Thereafter the actual reaper walking along the same row removes the stem sheath or boot from the brush and cuts the brush head from the bent stalk with a hand knife, placing the cut brush at the base of the stalks to free his hands for subsequent operations, from whence they are later gathered by still a third operator and bundled.

In contrast to this my machine is adapted, when propelled along the row by animal or other power, to at one operation continuously gather and hold the brush heads erect before a cutter, cut them from the growing stalks, serially deliver them still erect toward the rear of the machine, strip the stem sheath or boot from them, lodge, bundle, tie, and deliver the finished product behind the machine at a relatively high rate of speed.

Figure 1:
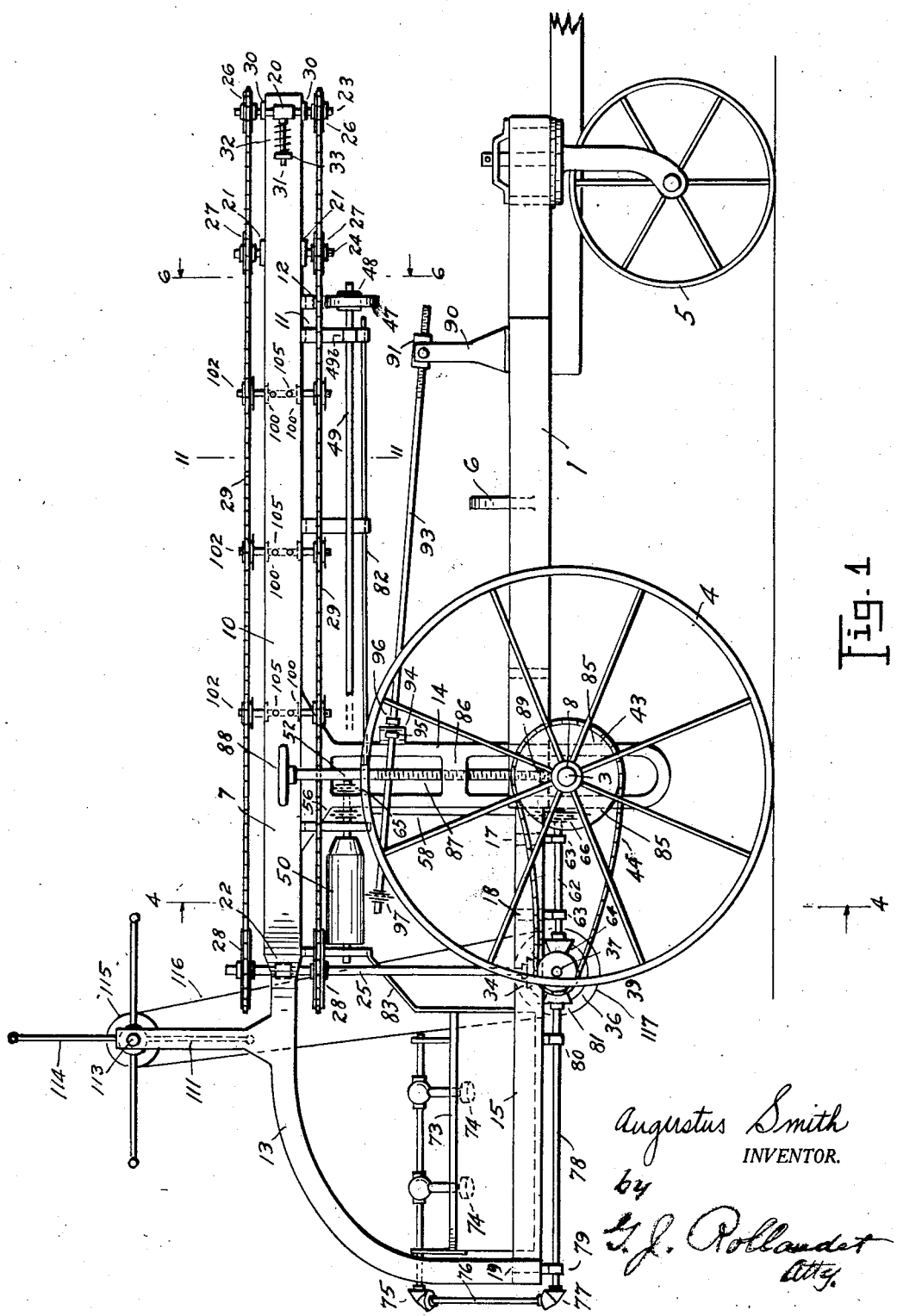
Figure 4:
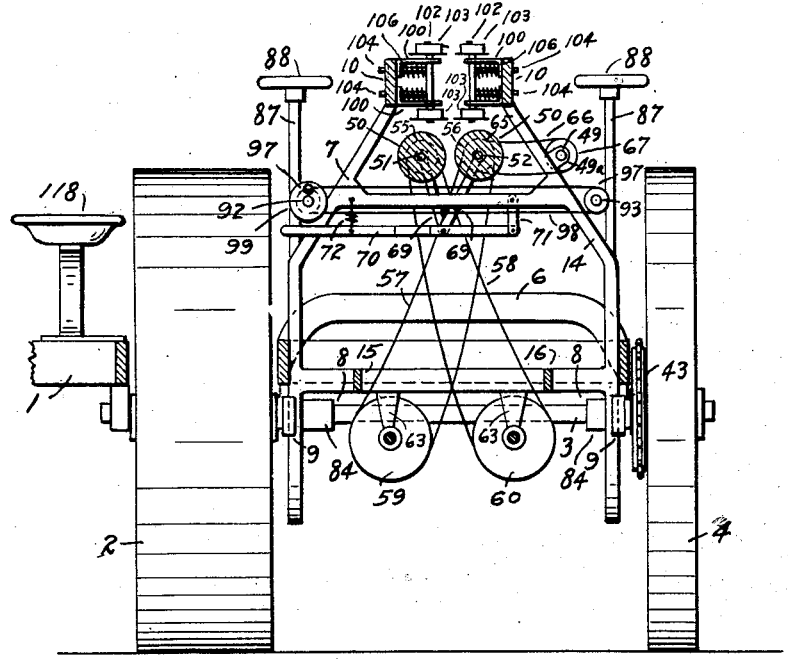
Figure 9:
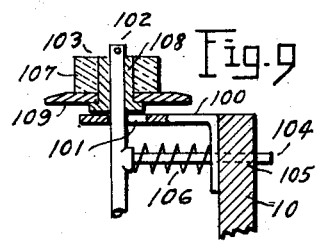
Figure 6:
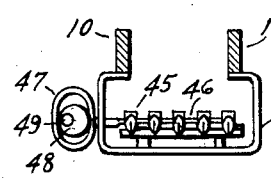
Figure 5:
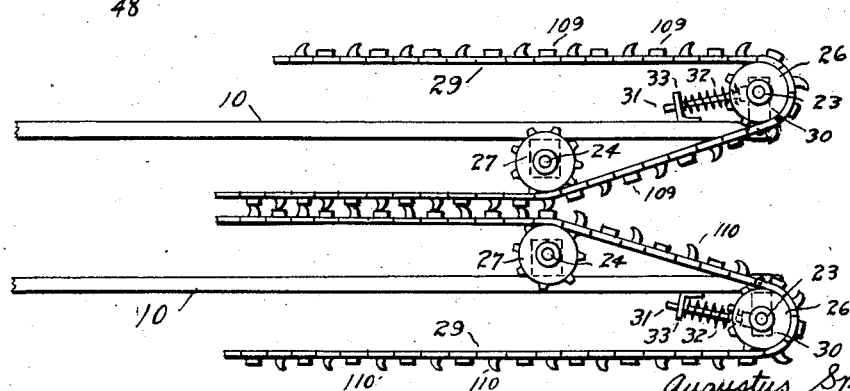

These highly desirable objects are accomplished by the mechanisms illustrated in the accompanying drawings, in which Fig. 1 is a side elevation of the entire machine; Fig. 2 is a plan view of the machine with the doffing reel removed; Fig. 3 is a rear elevation of the complete machine; Fig. 4 is an elevation on line 4—4 of Fig. 1; Fig. 5 is an enlarged plan view of the gathering and delivering mechanism as seen near the front end of the machine; Fig. 6 is a section on line 6—6 of Fig. 1; Fig. 7 is an end elevation of the booter mechanism; Fig. 8 is a perspective view of one booter cylinder; Fig. 9 is an enlarged detail of a portion of a guide idler assembly; Fig. 10 is an enlarged plan detail of a fragment of one form of gathering and delivering band showing gripping elements; Fig. 11 is a section through framework on line 11—11 of Fig. 1; Fig. 12 is an enlarged face view of the elements shown in Fig. 10.

Referring to the drawings, under-frame 1 is supported on traction wheel 2 rigidly attached to rotatable main shaft 3, on idle road wheel 4, and on caster wheel 5. Under-frame 1 has cross member 6 arched upward. Mounted on under-frame 1 is tiltable frame 7 pivoted at 8 and vertically slidable in guide shoes 9. Frame 7 comprises forwardly and rearwardly extending parallel spaced horizontal spars 10 separated by rigid drop-center tie bars 11 and 12, downward curved spar extensions 13, rigid guide frame structure 14, horizontal stringers 15 and 16, and cross members 17, 18, and 19.

Spars 10 carry vertical bearings 20, 21, and 22 in which are supported shafts 23, 24, and 25 carrying wheels 26, 27, and 28. Around these wheels endless gathering bands 29 are wrapped as shown. Bearings 21 and 22 are rigidly attached to spars 10, but forward bearings 20 are mounted in spring controlled take-ups comprising brackets 30 pivoted on the spars at one end and engaging shafts 23 at the other end. Bearings 20 have stems 31 which are encircled by springs 32 and whose outer ends are freely supported in lugs 33 on spars 10. Springs 32 reacting against bearings 20 and lugs 33 cause wheels 26 to be continually pressed forward, maintaining a predetermined tension in bands 29.

Wheels 26 and 27 are freely mounted for rotation on their respective shafts but wheels 28 are rigidly attached to their shafts 25 which latter extend vertically downward and carry bevel pinions 34 engaging bevel gears 35 and 36 on cross countershaft 37.

Shaft 37 is supported in bearings 38 carried on stringers 15 and 16, and carries sprocket 39 attached thereto by disconnecting friction clutch 40 operated by shifter 41 and hand lever 42.

Rigidly attached to main shaft 3 is sprocket 43 connected with sprocket 39 by drive chain 44.

Somewhat to the rear of wheels 27 and below the lowermost pair of gathering bands are sickle guide fingers 45 rigidly attached to tie bar 12 and carrying sickle-bar 46 reciprocably movable by eccentric strap 47 engaging eccentric 48 attached to longitudinal drive shaft 49, shaft 49 being supported in bearings 49ª and 49ᵇ.

Toward the rear and also below the lowermost gathering bands are located rotatable spaced horizontal booter cylinders 50 mounted on shafts 51 and 52 carried in bearings 53 guided for horizontal sliding in brackets 54 attached to frame structure 14. Shafts 51 and 52 carry sprockets 55 and 56 connected respectively through drive chains 57 and 58 with sprockets 59 and 60 on short longitudinal countershafts 61 and 62. Shafts 61 and 62 are carried in bearings 63 mounted on members 17 and 18 and have at their rear ends bevel pinions 64 engaging bevel gears 35 and 36. Booter shaft 52 also carries sprocket 65 communicating by chain 66 with sprocket 67 on longitudinal sickle drive shaft 49.

Booter cylinders 50 have a plurality of short peripheral radial blades 68 of a flexible material or of a yieldably mounted semi-rigid material. Pivoted on shafts 51 and 52 are pendent links 69 having their lower ends pivotally attached to hand lever 70. Lever 70 is supported at one end for slight oscillation by linkage 71 on framework 14, and is yieldably supported intermediate of its length by spring 72 which is also attached to framework 14.

Supported on stringers 15 and 16 which are rearwardly suspended from extensions 13 is inclined table 73 similar in make-up and accessories to the well known bundle table of grain harvesters, excepting that in place of the usual single bundle tie knotter, two knotters 74 are in this case mounted with their accessories in spaced relation within and upon the table. Since the mechanism of the knotters and their accessories may be of any well-known construction and since the tying means per se is not a part of the present invention, it is merely indicated in the drawings. Said mechanism is driven in harmony with the other appurtenances of the machine through bevel gears 75, inclined shaft 76, bevel gears 77 and longitudinal countershaft 78. Shaft 78 is mounted in bearings 79 and 80 attached to cross member 19 and stringer 16 and has at its forward end bevel pinion 81 engaging bevel gear 36.

Disposed longitudinally between but slightly below spars 10 is shallow tray or apron 82 supported on ties 11 and frame structure 14. Communicating between booters and bundle table is receiving apron 83.

Main shaft 3 is carried in bearings 84 rigidly attached to underframe 1. Bearings 84 have formed thereon guide shoes 9 engaging upright guide members 85 forming part of the guide frame structure 14. Directly above main bearings 84 are threaded blocks 86 rigidly mounted in the guide frame structure at either side and engaging vertical screw shafts 87. Shafts 87 are provided with hand wheels 88 at their upper ends while their lower ends engage depressions 89 in top of main bearings 84. Thus it will be noted that by manipulating hand wheels 88 simultaneously tiltable frame 7 may be raised or lowered resulting in a shifting of its pivot points along guides 85, frame 7 carrying with it practically all the motive mechanism of the machine as a unit, the location of cross shaft 37 being so chosen that only a slight slackening or tightening of drive chain 44 will occur throughout the two extremes of upward or downward travel of the tilting frame along the guide shoes 9.

Pivoted in uprights 90 rigidly attached to under-frame 1 are threaded nuts 91 engaging rearwardly extending screw shafts 92 and 93. Shafts 92 and 93 pass through eyes 94 on tilting frame, the shafts being collared at 95 and 96 each side of said eyes. Near the rear ends of shafts 92 and 93 are sprockets 97 connected by chain 98. Shaft 92 on the left hand side of the machine is slightly extended and carries cranked handwheel 99. It will be seen that by manipulating the crank on handwheel 99 tilting frame 7 may be drawn forward or thrust backward thereby elevating or depressing the gathering device at the forward end of the machine as well as the sickle mechanism, the location of nuts 91 being so chosen that the inclination of the spars 10 will not be markedly disturbed by any desired adjustment of the tilting frame along guides 85.

Disposed at intervals between spars 10 are bearings 100 having slots 101 supporting vertical shafts 102 carrying idler rollers 103 engaging the inmost strands of bands 29. Vertical shafts 102 have lateral arms 104 engaging apertures 105 in spars and encircled by springs 106 so mounted that opposed pairs of idlers are urged toward each other against bands 29, but are limited in lateral movement by the length of slots 101. Idlers 103 are preferably comprised of a body portion 107 of yieldable material such as rubber, a core 108 of rigid material such as iron, and a flange 109 of tough non-metallic material such as fiber.

Gathering bands 29 comprising linked elements or of an otherwise flexible construction, have relatively closely spaced pads 109 of a resilient material such as rubber projecting from their faces alternated with projecting rigid prongs 110 preferably of a slightly hooked form and of rigid material such as steel; bands 29 being so arranged upon their respective wheels that the pads of the inner strand of each band are opposed to the prongs of the other band as the bands traverse the longitudinal space between spars.

Chain 66 connecting sprocket 65 on booter shaft to sprocket 67 on sickle drive shaft, and also downward leading chains 57 and 58 from sprockets 55 and 56, are so mounted as to be normally in a somewhat slackened condition, so that booter cylinders 50 may be caused to approach toward or recede from each other by manipulation of hand lever 70 without materially affecting driving conditions.

Uprights 111 attached to spar extensions 13 carry bearings 112 in which are journalled shaft 113 having secured thereto doffing reel 114. Sprocket 115 fixed to shaft 113 communicates through chain 116 with sprocket 117 fixed to cross shaft 37.

Driver's seat 118 located on the lefthand side of the machine gives the operator easy access to handwheel 97, levers 42 and 70, and also permits him to observe the guiding, elevation, and performance of the sickle and the gathering mechanism.

In operation, the machine being assumed to have arrived at the desired point in the field with the principal mechanism disconnected from the road wheel, the tilting frame is first raised or lowered along the guide shoes 9 the proper amount to bring the cutter sickle to the average suitable height for the field to be harvested by manipulation of handwheels 88. Thereupon with the machine under power and directed along the first row selected for harvesting, the clutch 40 is engaged by means of hand lever 42, whereupon power from traction wheel 2 is delivered through main shaft 3 to sprocket 43, to chain 44, to sprocket 39, to cross shaft 37, to bevel gears 35 and 36, to bevel pinions 34, to wheels 22, and thence to gathering bands 29, the motion of the bands being backward along the central portion of the machine. At the same time power from bevel gears 35 and 36 is transmitted through pinions 64 to longitudinal countershafts 61 and 62, to sprockets 59 and 60, to chains 57 and 58, to sprockets 55 and 56, to shafts 51 and 52 and thus to booter cylinders 50, the resulting rotation of these cylinders being inward and downward.

Likewise power from booter shaft 52 and sprocket 65 is transmitted through chain 66, sprocket 67, and longitudinal shaft 49 to eccentric 48 and eccentric strap 47, causing sickle bar 46 to be reciprocated.

Furthermore, power from bevel gear 36 is transmitted to bevel pinion 81 and thence to rearward longitudinal countershaft 78, to bevel gears 77, to inclined shaft 76, to bevel gears 75, and thence to knotters 74 and their accessory mechanism; while at the same time power from cross shaft 37 is transmitted through sprocket 117 and chain 116 to sprocket 115, to shaft 113, and thus to doffing reel 114, the resulting rotation of the reel being downward and to the rear.

As the machine is continuously propelled along the row with the spars 10 astride the growing stalks the operator so varies the elevation of the foremost end of the tilting frame from time to time as to cause the prongs of the gathering bands 29 to engage the growing brush heads from either side at points spaced vertically along stem and branch, said points being so located upon the plants as to produce the desired length of stem on the product after cutting. As the machine advances, the growing stalks, whether upright or inclined, are drawn inward toward the cutting throat between wheels 27 where converging strands of the gathering bands gently grip the brush, holding it in an upright position without injury, while it is cut from its stalk by the advancing sickle. After being cut from the stalks the brush heads continue to be gripped between the now parallel strands of the bands which are kept taut by springs 32 of take-up mechanism and urged toward each other by the resilient idlers 103 and springs 106, so that as the strands continue to travel rearward the successive brush heads as cut away from their parent stalks are retained serially in an upright position. In the meantime tray 82 is safeguarding against any undue downward slipping of any stem during its passage.

Upon arrival adjacent the booter the conical shape of the forward end of booter cylinders 50 serve to guide the approaching stems accurately between the cylinders, where the downward moving blades 68 applying a variable pressure, controllable at will by the operator through hand lever 70, against the successive stems operate to remove the stem sheath or boot, which latter falls to the ground below while the brush heads, still gripped by the pads and prongs of the gathering bands, proceed over and beyond the booter cylinders until they encounter the slowly revolving doffing reel 114 which, moving downward and to the rear, tends to tilt the successive brush heads downward into a horizontal position with forward pointing stems at the moment of release from the grip of the gathering bands.

Upon reaching table 73 in a sufficient number the brush head units are automatically gathered into bundles, tied at two points along their length, and discharged in a similar manner to the well known grain harvester, along the side of the machine.

It will be noted that the machine as shown is arranged for two tying points on the bundles instead of one as in the case of grain bundles, and it may be even found desirable to provide ties at additional points in excess of two along the bundle length, which may obviously be done without in any way affecting the essential operations of the balance of my machine.

Friction clutch 40, in addition to providing means for connecting and disconnecting, is intended to provide a flexible driving ratio between road wheel 2 and the balance of the mechanism. Thus, if during the operation of the machine along any row it should be found to occur that the backward speed of the gathering bands does not properly synchronize with the forward movement of the machine along the ground in such a way as to maintain the gathered stalks in a suitably erect position for cutting, the operator may slightly adjust the speed ratio from time to time by causing the friction clutch to more or less firmly engage its working faces.

The upward arching of cross member 6 is for the purpose of avoiding undue forward bending of colliding standing stubble and the consequent entanglement of the latter with the sickle.

I claim:—

1. In a broom corn harvester adapted to operate upon a row of standing broom corn, a frame mounted upon road wheels, a cutter for removing the broom from the growing stalks of said broom corn, means for gathering said stalks and presenting them to said cutter, means for booting the stems of the cut brooms, means for passing the brooms progressively over the cutter and over the booter, means for gripping and holding said brooms erect while so passing, means for propelling the harvester along the row, and means for progressively varying the length of stem on the cut brooms, and means for operating the various elements of the machine in proper synchronism.

2. In a broom corn harvester adapted to operate on a row of growing broom corn, a frame supported on road wheels, broom gathering and broom cutting means attached to said frame, gripping means for holding the cut brooms substantially erect, means for delivering the brooms continuously to and beyond the cutting means, booter cylinders in the path of travel of the moving brooms for removing the stem sheaths from said brooms, and means for checking misalignment of the stems of the moving brooms.

3. In a broom corn harvester adapted to traverse a row of standing broom corn, a pair of opposed chains trained over a series of wheels adapted to operate in a substantially horizontal plane, a similar pair of chains and series of wheels in superposed spaced relation to said first chains and wheels, gathering and gripping means formed upon or attached to the faces of said chains, and means for driving said chains in unison with their inmost adjacent strands moving in like direction.

4. The combination set forth in claim 3 in which the said gathering and gripping means consist of a plurality of resilient pads alternated with a plurality of rigid prongs, said chains being so trained and maintained upon their wheels that the pads and prongs on the inmost adjacent strands of opposed chains are in staggered relation, and that in each case a pad is opposed to a prong throughout the travel of the inmost strands.

5. The combination set forth in claim 3 together with a booter, said booter comprising substantially horizontal opposed cylinders adapted to rotate, a plurality of yieldable longitudinal radial blades upon the periphery of said cylinders, means for driving said cylinders, and means for varying the separation between said cylinders while they are under motion.

6. In a broom corn harvester adapted to traverse a row of standing broom corn, an under-frame mounted on road wheels, a tiltable superstructure pivoted upon said under-frame, a cross shaft mounted upon said under-frame, bearings comprising pivots for said superstructure mounted upon said shaft, guide shoes formed upon said bearings, guides formed upon said superstructure and engaging said shoes, spaced parallel and substantially horizontal spars extending forward of said superstructure, vertical shafts carrying wheels mounted upon said spars, pairs of bands adapted to function upon either side of said row of broom corn trained over said wheels for gripping the stems and branches of said broom corn, a booter mounted along the pathway of said bands, a cutter mounted upon said spars along the pathway of said bands, and means for driving said bands, said cutter and said booter in suitable synchronism.

7. The combination set forth in claim 6. wherein said driving means comprises motive power derived from road wheel or wheels through combinations of driving chains and gearing; together with means for varying and controlling the movement of the superstructure vertically along the said guides without disturbing the driving relations of the various motive parts of the machine.

8. The combination set forth in claim 6, together with a series of opposed spring controlled guide idlers for engaging the inmost adjacent strands of said bands and assisting the gripping action of said bands on said broom corn stems and branches.

9. The combination set forth in claim 6, wherein said driving means comprises motive power derived from the road wheel or wheels through combinations of driving chains and gearing; together with means for varying the speed of travel of the bands relative to the advance of the harvester along the ground.

10. In a broom corn harvester, a frame supported on road wheels, a tiltable frame pivoted to the first-mentioned frame, broom cutting means and broom booting means mounted upon the tiltable frame, means for successively presenting the brooms to the cutting and booting means, and means for tilting and lodging the cut brooms at a predetermined time after passing the booting means.

11. In a broom corn harvester, a frame supported on road wheels, a tiltable frame pivoted to the first-mentioned frame, broom cutting means and broom booting means mounted upon the tiltable frame, means for successively presenting the brooms to the cutting and booting means, means for lodging the cut brooms progressively as they pass beyond the booting means, and means for bundling and tying successive accumulations of the lodged brooms.

12. In a broom corn harvester, a frame supported on road wheels, broom cutting means on said frame, means for delivering the brooms to the cutting means, and means for keeping the stems of the moving brooms in alinement as they approach and pass through the cutting means.

13. In a broom corn harvester, cylinders having longitudinal ribs adapted to remove the stem sheaths from the brooms, means for conveying the brooms and sheaths to said cylinders, and means for driving the cylinders and the conveying means.

14. In a broom corn harvester, cylinders having resilient ribs adapted to remove the stem sheaths from the brooms, means for conveying the brooms and sheaths to said cylinders, and means for driving the cylinders and the conveying means.

15. In a broom corn harvester, means for gathering standing broom corn and holding same erect, means to cut the brooms from the stalks, a doffing reel to move the brooms from said erect position, and tying means to receive the brooms from the doffing reel and bind them in bundles.

16. In a broom corn harvester, cylinders adapted to remove the stem sheaths from the brooms, means for conveying the broom and sheaths to said cylinders, means for moving the cylinders closer together or farther apart to maintain their operativeness under different conditions, and means for driving the cylinders and the conveying means.

17. In a broom corn harvester, a frame supported on road wheels, a tiltable frame on said frame, broom corn gathering, and cutting means on the tiltable frame, means for tilting the latter frame, and means apart from the foregoing for raising and lowering the entire tiltable frame relative to the first-mentioned frame.

18. In a broom corn harvester, endless moving members, and resilient and rigid means on the members cooperating with each other for gathering and conveying the broom corn, and means for driving said members.

19. In a broom corn harvester, moving endless members for gathering and conveying the corn, resilient pads on the members alternating with rigid prongs thereon, the members being relatively disposed so that the pads on one member will be cooperatively opposed to the prongs on the other member.

20. In a broom corn harvester, endless moving members for gathering and conveying the corn, resilient means on the members for engaging the corn, and idlers having resilient surfaces maintaining the members in position.

In testimony whereof, AUGUSTUS SMITH, the applicant named in the application for patent, Serial No. 154,621, filed December 13, 1926, hereby affixes his signature to the specification filed with said application.

AUGUSTUS SMITH.